United States Patent [19]

Vollhardt

[11] Patent Number: 4,909,162
[45] Date of Patent: Mar. 20, 1990

[54] INSTALLATION FOR LOW-TEMPERATURE CARBONIZATION OF WASTE AND IMPURE MATERIALS

[75] Inventor: Frohmut Vollhardt, Oberhausen, Fed. Rep. of Germany

[73] Assignee: MAN Gutehoffnungshütte GmbH, Oberhausen, Fed. Rep. of Germany

[21] Appl. No.: 242,371

[22] Filed: Sep. 9, 1988

[30] Foreign Application Priority Data

Sep. 12, 1987 [DE] Fed. Rep. of Germany ....... 3730729

[51] Int. Cl.⁴ .......................... F23B 7/00; F23G 5/12
[52] U.S. Cl. .................................. 110/234; 110/229; 110/230; 110/211
[58] Field of Search ............... 110/210, 234, 224, 229, 110/230, 235, 226, 255, 257, 211, 214, 346, 231, 204; 122/4 C, 7 R

[56] References Cited

U.S. PATENT DOCUMENTS

| 1,809,819 | 3/1927 | Caller | 110/226 |
| 3,716,339 | 2/1973 | Shigaki et al. | 110/226 |
| 3,954,069 | 5/1976 | Loken | 110/226 |
| 4,417,528 | 11/1983 | Vining et al. | 110/229 |
| 4,512,266 | 4/1985 | Shigaki | 110/204 |
| 4,516,511 | 5/1985 | Kuo | 110/234 |

FOREIGN PATENT DOCUMENTS

| 881187 | 6/1953 | Fed. Rep. of Germany. |
| 888237 | 8/1953 | Fed. Rep. of Germany. |
| 888238 | 8/1953 | Fed. Rep. of Germany. |
| 3400976 | 8/1985 | Fed. Rep. of Germany. |
| 709832 | 1/1931 | France .......................... 110/231 |
| 1412865 | 11/1975 | United Kingdom. |

Primary Examiner—Edward G. Favors
Assistant Examiner—Denise L. Ferensic
Attorney, Agent, or Firm—McGlew & Tuttle

[57] ABSTRACT

An installation for the low temperature carbonization of waste under the exclusion of air with a low temperature carbonization cylinder, in particular device for after-burning of residual materials for the low-temperature carbonization installation, has an improved energy balance by carrying out a low-temperature carbonization so as to increase the ratio of internal energy requirement to energy release in favor of energy release. The carbon containing residual materials from the low-temperature carbonization cylinder are exposed to a complete after-burning on an inclined step grate and also a subsequent after-burning in a chamber. The burning gases for the burning devices of the step-grate are low temperature carbonization gasses obtained from the low-temperature carbonization installation. Gases from a waste heat boiler arranged after the after-burn chamber are utilized as heating gases for a low-temperature carbonization installation cylinder. After-burning of the residual material follows a low-temperature carbonization installation for low-temperature carbonization of waste and impure materials.

12 Claims, 1 Drawing Sheet

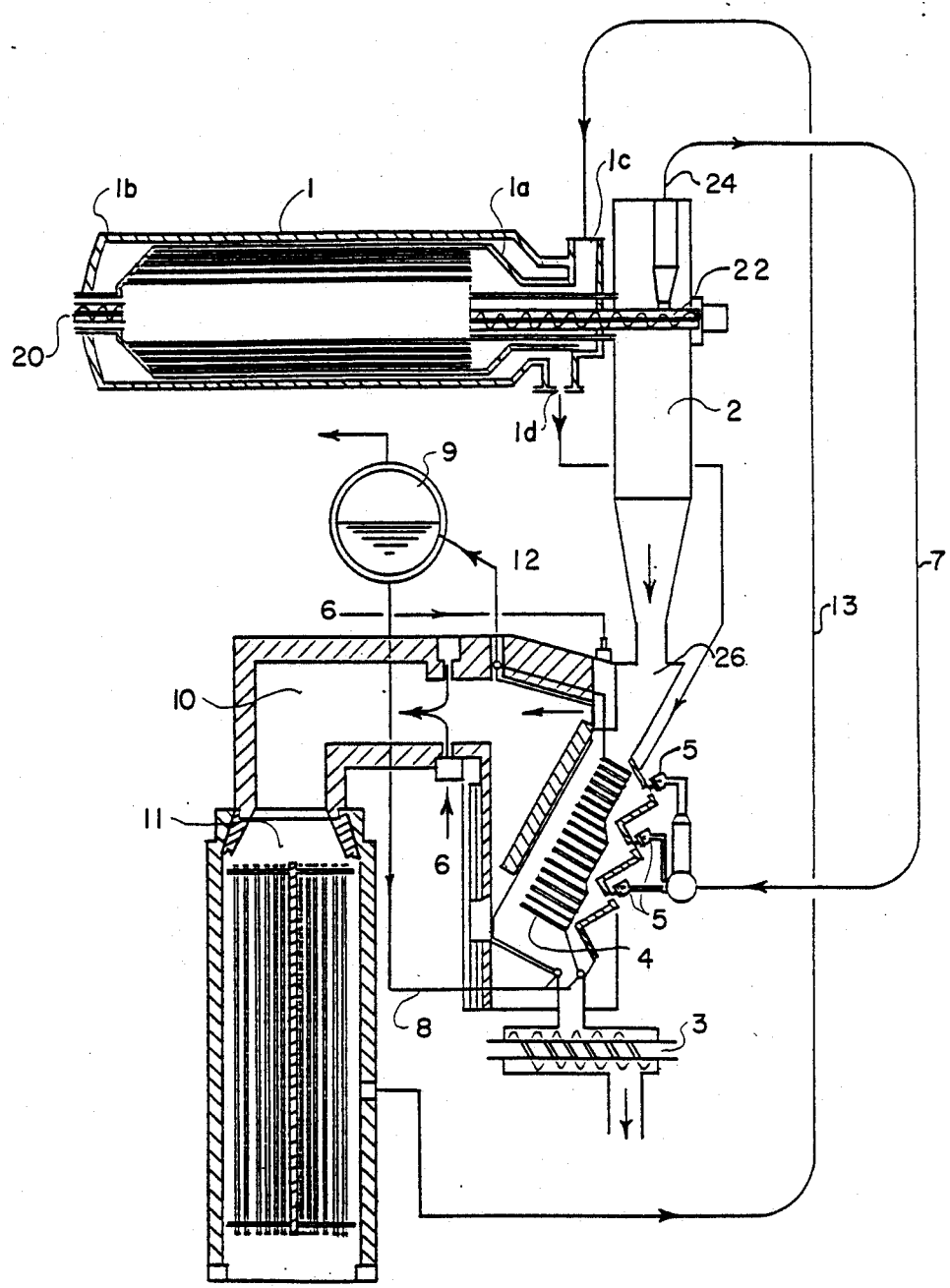

INSTALLATION FOR LOW-TEMPERATURE CARBONIZATION OF WASTE AND IMPURE MATERIALS

FIELD AND BACKGROUND OF THE INVENTION

The invention relates in general to waste disposal devices and disposal methods and to a new and useful installation for low-temperature carbonization of waste and impure materials under the exclusion of air with a low-temperature carbonization cylinder, and in particular to a device for after-burning of residual materials from the low-temperature carbonization installation.

Low-temperature carbonization installations for the waste removal of household and industrial waste and the like are known, for example from DE-PS 24 32 504. In such low-temperature carbonization installations, through pyrolysis, a thermal treatment of waste takes place, which ensures gain of basic materials while placing the least possible stress on the environment and converting the solid waste into a gaseous fuel which is readily burnable. Pyrolysis, hence, is a method of dry distillation which is carried out in an oxygen-free atmosphere.

A low-temperature carbonization installation is described, for example in "VGB Kraftwerkstechnik" (VGB Power Plant Technology) 66, No. 5, May 1986. In this installation unsorted household garbage is reduced in size and introduced via a feed system into an indirectly heated rotating cylinder. In a heating gas generator a part of the generated pure gas is burned. The originating gas fumes are carried together with exhaust gases of a gas motor through the heating gas pipes of the rotating cylinder. The garbage is heated to approximately 500° C. At this temperature and a dwelling time of the garbage of 60 to 90 minutes the garbage is degassified. Non-ferrous and heavy metals are not oxidized since in the rotating cylinder a reduced water vapor/ammonia atmosphere obtains. At the discharge end of the rotating cylinder the gaseous and the solid stream of matter are separated. The residual material is carried off via a discharge system. Following the treatment of the garbage in the low-temperature carbonization cylinder is the treatment of the low-temperature carbonization gases in the gas converter and the gas purification.

The residual materials which are discharged from the low-temperature cylinder contain, as a rule, still a high fraction of combustibles in the form of carbon, specifically approximately 5 to 20 percent by weight. Long-term experiments, with respect to the ability of these carbon-containing residual materials to be deposited in a dump, have shown that the deposition in terms of the danger of spontaneous combustion is not critical.

For the energy household of the low-temperature carbonization installation, however, reducing the carbon fraction in the residual material would be desirable in order to be able to compete economically with other methods, for example garbage burning. 50% of the energy contained in garbage is today utilized for the internal requirement of the garbage burning installation and only 50% are utilized as energy output (heat flow). Here, however, the goal is to improve the ratio of internal energy requirement to energy release in favor of energy release.

SUMMARY AND OBJECTS OF THE INVENTION

It is an object of the invention to improve in a low-temperature carbonization installation the energy balance in such manner that the low-temperature carbonization gas from a heated rotating cylinder is utilized for burning the carbon fractions of the residual material from the low-temperature carbonization. The remaining solid residual materials can be deposited or dumped without generating any problems and the gases can be utilized as heating gases for heating the low-temperature carbonization cylinder and also for further heat recovery.

According to the invention, the discharge device for residual materials on the low-temperature carbonization cylinder is succeeded by a step grate provided with a burning device with subsequent after-burn chamber and waste heat boiler with a steam cylinder.

According to the method of operation a reduced pressure is employed in a low-temperature carbonization installation a substoichiometric combination of residual material takes place on the step grate. Subsequently, the complete low-temperature gas burning takes place stoichiometrically on the inlet from the step grate to the afterburner chamber and at the inlet to the afterburn chamber, and the heating gas for the low-temperature carbonization cylinder is taken from the waste heat boiler succeeding the afterburner chamber at the desired temperature.

The residual material from the low-temperature carbonization cylinder is placed uncooled at the exit temperature of 400° to 600° C. on the oblique step grate. On the backside of the grate, several small burning devices are arranged which are supplied with low-temperature carbonization gas from the low-temperature carbonization cylinder as burn gas. The burn gas can reach through the interspaces of the steps of the grate overlapping each other and formed by the flat irons welded onto the water pipes into the material to be burned and in the presence of oxygen bring about the combustion. Cooling the step grate takes place with the water vapor mixture of the circulation of the waste heat boiler.

The obliquity of the step grate is adjustable. The drop as well as the rise ducts as also the low-temperature carbonization gas feed ducts to the burning devices on the grate are connected elastically in order to be able to handle changes of the inclination angle of the step grate without problems. This elastic pipe connection also permits, when necessary, the introduction of shaking motions to the step grate to further the sliding of the residual material into the proper position.

Following the first burn stage, which was carried out stoichiometrically on the step grate, the complete burning of the carbon fractions contained in the residual materials and other combustible products takes place in a second burning stage, on the way to the chamber and also in the inlet region of the afterburner chamber itself and in the presence of oxygen.

For discharging the non-combustible residual materials a removal, worm is arranged below the step grate.

The gas fumes from the waste heat boiler succeeding the afterburner chamber are partially utilized as heating gases for the low-temperature carbonization cylinder.

Accordingly it is an object of the invention to provide an improved waste disposal system which includes a low-temperature carbonization cylinder which has an interior chamber for waste material on which a heating gas is circulated for the low-temperature carbonization of the waste material which is subsequently discharged from the low-temperature carbonization cylinder to a grate where further burning is carried out with the assistance of the heating gases used for the low-temperature carbonization cylinder and also using a burner and wherein the burned gases which is non-combustible is removed from the grate and the further gases which are produced are subject to an afterburning in an afterburner chamber of the flue of a waste heat boiler.

A further object of the invention is to provide a waste disposal system and a waste disposal method in which the waste material is subject to a low temperature carbonization and thereafter a burning and an afterburning during which the heating gases used in the low-temperature carbonization are used for the burning and afterburning at least partially.

A further object of the invention is to provide a waste disposal installation which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

The only figure of the drawings is a somewhat schematic sectional representation of a waste disposal plant constructed in accordance with the invention.

DESCRIPTION OF THE PREFERRED EMBODIMENT

Referring to the drawing in particular, the invention embodied therein comprises a waste disposal system which includes a low-temperature carbonization cylinder generally designated 1 having an interior waste chamber 1a and an outer housing 1b which is spaced around the waste chamber 1a so as to define a heating gas flow space therebetween which forms a heating gas inlet 1c and a heating gas outlet 1d.

In accordance with the invention, waste to be treated is delivered to a waste inlet 20 and conveyed into the chamber 1a and after carbonation is directed out through a discharge 22 into a discharge device 2. The discharge device 2 has a heating gas discharge 24 which flows through a low-temperature carbonization gas line 7 to a burner 5 of the step grate 4 which receives the partially carbonized waste material from a discharge 26 of the discharge device 2. Burning of the partially carbonized material takes place on the grate 4 with the help of burners 5 and heating gases fed from the discharge 1d of the low temperature carbonization cylinder 1. The heating gases which still remain in the grate are delivered through a gas discharge flue which enters into an afterburner chamber 10 which is supplied with additional combustion air through a combustion air line 6 for an afterburner of the waste material. The afterburner chamber 10 is located in a waste heat boiler 11 and the heat which is generated in the boiler 11 is also circulated to the low temperature carbonization cylinder 1 through a circulation line 13. Heating coils arranged in the grate 4 supply additional heating fluid which is circulated through lines 8 and 12 and into a steam drum 9.

Residual materials from the low-temperature carbonization cylinder 1 are discharged through a discharge bin or device 2 and delivered onto the burning grate 4.

The burning grate 4 is shown as a greatly inclined basket-shaped step grate 4. The steps of the grate 4 are formed of flat irons. Water cooling pipes or ducts 8 are arranged below the flat irons of the grate 4. The pipes 8 are integrated into a cooling water circulation system of water and water vapor mixture which is delivered through the drop ducts 8 and the rise ducts 12 to the steam cylinder 9 of the waste heat boiler 11.

On the backside of the step grate 4 are located burning devices 5 which are supplied with burn gases or low temperature carbonization gas 7 from the low-temperature carbonization cylinder 1.

The burning of the residual carbon and other combustible materials takes place on the way to the afterburning chamber 10 following the step grate 4 and in the entrance region of the afterburner chamber.

The air supply for the afterburner is delivered through ducts 6 in the direction of the arrows.

From the waste heat boiler 11 following the afterburn chamber 10 a part of the gases having a desired temperature are taken and supplied to the low-temperature carbonization cylinder 1 as a heating gas through a duct 13.

While a specific embodiment of the invention has been shown and described in detail to illustrate the application of the principles of the invention, it will be understood that the invention may be embodied otherwise without departing from such principles.

What is claimed is:

1. An installation for treatment of waste and impure materials, comprising:
   low temperature low pressure carbonization cylinder means including a waste intake and a waste discharge and a heating gas intake, a heating gas flow space and a heating gas discharge for a substantially oxygen free thermal treatment of waste;
   a discharge device connected to said waste discharge of said carbonization cylinder means;
   a step grate chamber connected to said discharge, said step grate chamber including a step grate;
   a burner directed at said grate;
   afterburner means connected to said step grate chamber, said afterburner means including an intake for combustion of residual carbon and other combustible material from said step grate chamber; and
   heat recovery means connected to at least one of said step grate chamber and said afterburner for recovering heat from combustion generated in one of said step grate chamber and afterburner.

2. An installation for the low-temperature carbonization of waste and impure materials according to claim 1, wherein said step grate is arranged obliquely and comprises a basket-shaped grate structure forming steps being made of water carrying pipes having flat irons welded thereto.

3. An installation according to claim 2, wherein said water pipes are connected to a waste heat boiler for circulation of water through said water pipes.

4. An installation according to claim 1, wherein said heat recovery means includes rise ducts connected to said step grate and a steam cylinder connected to said rise ducts, a low-temperature gas duct connected to said burner directed at said grate said burner for said step grates being elastically supported and said step grate being adjusted as to its inclination.

5. An installation according to claim 1, wherein said heat recovery means includes a waste heat boiler connected to said afterburner for receiving hot gases from combustion and recovering heat from said hot gases.

6. An installation according to claim 1, wherein said heat recovery means includes a fluid circulation system flowing through said step grate for recovering heat generated during combustion.

7. An installation according to claim 1, wherein said heating gas intake is connected to a gas discharge of said heat recovery means for supplying heating gas from said heat recovery means to said carbonization cylinder means.

8. A waste disposal system comprising a low-temperature carbonization cylinder having an interior waster chamber and an outer housing spaced around said interior waster chamber and having a heating gas flow space defined between said chamber and said outer housing, said gas flow space having a gas inlet and a gas outlet, a waste inlet and a waste discharge connected to said waste chamber, a discharge device connected to said waste discharge and having a heating gas discharge, said discharge device having a partly carbonized waste material discharge, a step grate chamber having a burning grate connected to said waste material discharge, a burner arranged to burn waste material on said grate, said step grate changer device having a discharge for noncombustibles and a heating gas discharge, a waste heat boiler having an afterburning chamber connected to said burning grate heating gas discharge means for supplying combustion air to said afterburner chamber, and heat recovery means connected to at least one of said step grate chamber and said afterburner chamber for recovering heat from combustion.

9. A waste disposal system according to claim 8 further comprising a step grate cooling water circulation system and steam drum means for receiving fluid from the said step grate cooling water circulation system.

10. A method of operation of a waste disposal system comprising delivering the waste material to a low temperature carbonization cylinder and applying a heating gas to the cylinder from the exterior thereof for a substantially oxygen free thermal treatment for the waste material, directing the partly carbonized waste material to a step grate and heating the material on the step grate by burning some of the gases produced in the low-temperature carbonization cylinder so as to carry out a substoichiometric combustion on the step grate, carrying out a further stoichiometric combustion from the step grate to an afterburner chamber and in the inlet area of the afterburner chamber and recovering heat from said substoichiometric combustion and said stoichiometric combustion.

11. A method according to claim 10, wherein the temperature of the gases in the discharge device which is positioned between the low-temperature carbonization cylinder and the grate is maintained at from 400° to 600° C.

12. A method according to claim 10, wherein gases from said substoichiometric combustion and said stoichiometric combustion are directed to the low temperature carbonization cylinder.

* * * * *